No. 715,536. Patented Dec. 9, 1902.
K. BARNICKOL.
SAD IRON HOLDER.
(Application filed Apr. 22, 1902.)
(No Model.)
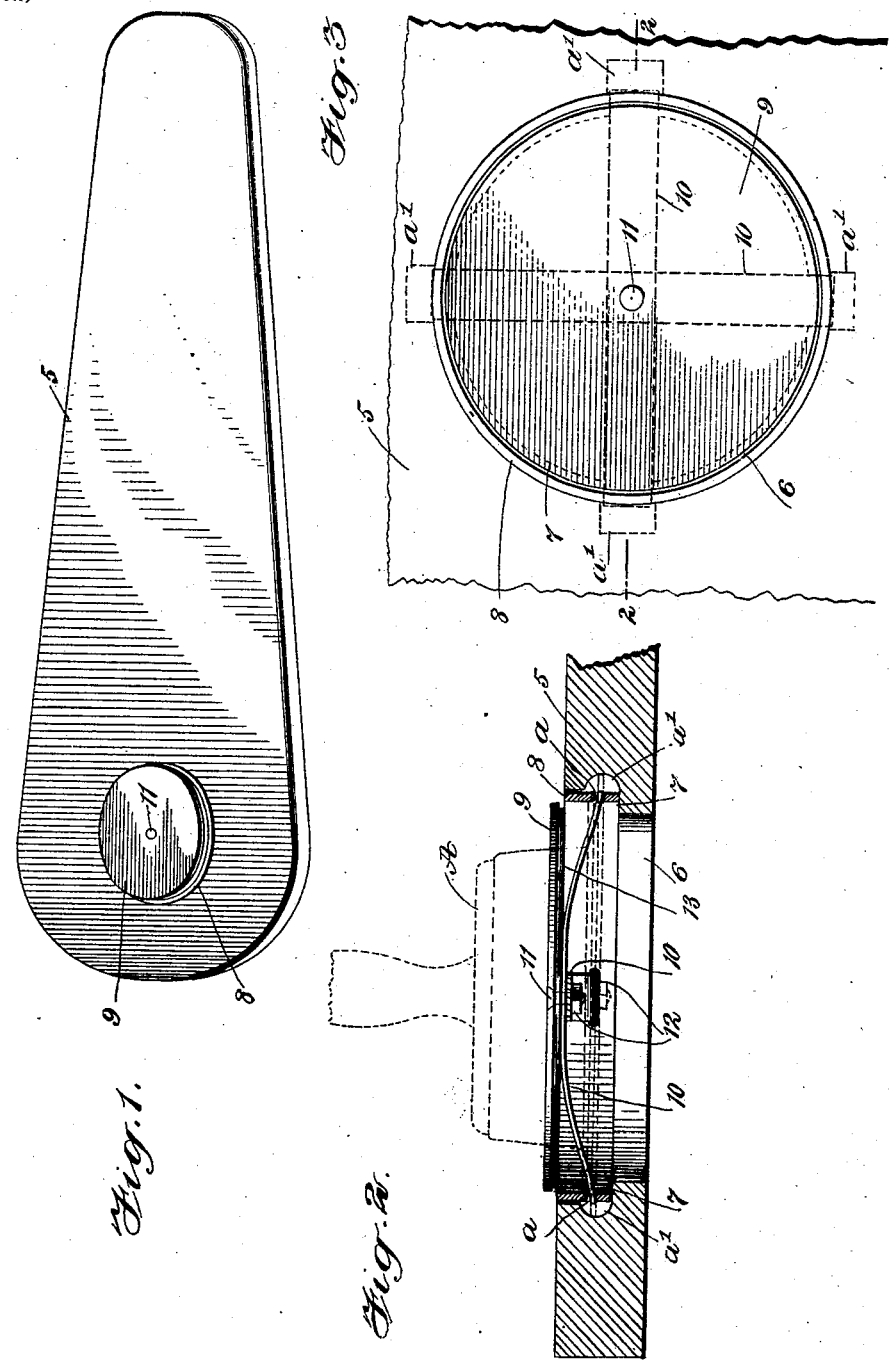
WITNESSES:
INVENTOR
Karl Barnickol
BY
ATTORNEYS.
THE NORRIS PETERS CO., PHOTO-LITHO., WASHINGTON, D. C.

United States Patent Office.

KARL BARNICKOL, OF ROME, NEW YORK.

SAD-IRON HOLDER.

SPECIFICATION forming part of Letters Patent No. 715,536, dated December 9, 1902.

Application filed April 22, 1902. Serial No. 104,099. (No model.)

*To all whom it may concern:*

Be it known that I, KARL BARNICKOL, a citizen of the United States, and a resident of Rome, in the county of Oneida and State of New York, have invented a new and Improved Sad-Iron Holder, of which the following is a full, clear, and exact description.

The object of this invention is to provide a holder for heated sad-irons which is connectible with an ordinary ironing-board and when in place is adapted to receive a hot sad-iron and hold it reliably against lateral displacement.

The invention consists in the novel construction and combination of parts, as is hereinafter described, and defined in the appended claims.

Reference is to be had to the accompanying drawings, forming a part of this specification, in which similar characters of reference indicate corresponding parts in all the figures.

Figure 1 is a perspective view of an ironing-board, showing the improved holder held thereon near one end. Fig. 2 is a transverse sectional view of the board and sad-iron holder substantially on the line 2 2 in Fig. 3, and Fig. 3 is an enlarged fragmentary plan view of the rear end portion of the ironing-board and a plan view of the improved sad-iron holder in position thereon.

The ironing-board 5 may be of the usual form shown and adapted for support by any suitable means. Near one end of the ironing-board an aperture 6 is formed therein in two diameters, the portion of said aperture having the smallest diameter being near the lower side of the ironing-board. It will be seen that where the upper portion of the aperture 6 reaches the portion thereof having less diameter an annular shoulder 7 is formed. In the upper portion of the aperture 6 a frame 8 in the form of a ring is loosely introduced and seats itself upon the shoulder 7.

A holder-plate 9, having such dimensions and peripheral form as adapts it to loosely fit in the upper portion of the aperture 6, is mounted upon the plate-springs 10, as shown in Fig. 2. Preferably two springs 10 are employed, and they have such tensional strength as to adapt them to properly support the holder-plate 9, which should be normally positioned flush with the upper edge of the frame 8 or slightly above it, as shown in Fig. 2. To adapt the plate-springs 10 for effective service, they are similarly bent into arched form and secured together at their centers, where they lap one upon the other. The preferred means for securing the springs 10 together and upon the lower side of the holder-plate 9 consists of the screw-bolt 11, the head of which seats in a countersunk perforation formed in the holder-plate at its center. The bolt-body passes down through the perforation in the holder-plate and also through registering perforations in the springs 10, where they lap upon each other, a nut 12, screwed upon the lower end of the bolt which depends below the springs, by adjustment, serving to clamp the springs together and upon the holder-plate, as indicated in Fig. 2. The springs 10 have sufficient length to permit them to extend at each end thereof through openings $a$, formed in the frame 8, and opposite each of said openings a recess $a'$ may be formed in the aperture 6 to permit end play of the springs 10 therein.

In service a sad-iron, such as A, (shown by dotted lines in Fig. 2,) may be seated upon the holder-plate 9, and instantly the weight of the sad-iron will depress said plate within the frame 8, the springs 10 yielding under the imposed weight of the iron, so as to be extended through the openings $a$ into the recesses $a'$, as indicated by dotted lines in Fig. 2. Preferably a facing-piece 13, of asbestos board, is secured upon the lower surface of the holder-plate 9, said facing-piece being introduced between the springs 10 and the holder-plate and held in place by the nut 12, as indicated in Fig. 2.

It will be seen that the facing-piece 13 will prevent downward radiation of heat from the holder-plate 9, and thus prevent injury to the table or other support whereon the ironing-board is seated.

As the sad-iron is seated in an open recess formed by the depression of the holder-plate 9 within the frame 8, it will be evident that the sad-iron will be prevented from sliding sidewise and be reliably held in position on the holder-plate until lifted therefrom.

As the frame 8 may be readily removed from the aperture in the ironing-board 5, it will be evident that the sad-iron holder may be used independently of the ironing-board and be seated on any available support for convenient service.

While I have shown the frame 8 as circular in form, it is to be understood that it may have a different shape, oblong or rectangular in contour, the other details being correspondingly altered in shape, all within the scope of the invention.

Having thus described my invention, I claim as new and desire to secure by Letters Patent—

1. A sad-iron holder, comprising a frame, a holder-plate, and arched springs secured on the lower side of the holder-plate and engaging their ends in openings in the frame.

2. A sad-iron holder, comprising a frame, a holder-plate, and arched springs crossed at their centers and held at said centers upon the lower side of the holder-plate, the frame having openings through which the ends of the springs may reciprocate.

3. A sad-iron holder, comprising a frame, a holder-plate, a heat-resisting facing-piece on the lower side of the holder-plate, and arched plate-springs held crossed at right angles upon the heat-resisting facing-piece by a bolt which passes through the holder-plate, the ends of the springs slidably engaging openings in the frame.

4. The combination with an ironing-board having an aperture near one end, said aperture having an annular shoulder on its defining-wall, of a sad-iron holder, comprising a frame-ring seating upon the shoulder, a holder-plate, and arched plate-springs held upon the holder-plate and having their ends engaging openings in the frame-ring.

In testimony whereof I have signed my name to this specification in the presence of two subscribing witnesses.

KARL BARNICKOL.

Witnesses:
 ELIJAH T. GARLICK,
 JACOB BARTHOLOMA.